United States Patent [19]

Tamai et al.

[11] Patent Number: 4,510,504

[45] Date of Patent: Apr. 9, 1985

[54] METHOD AND DEVICE FOR DETECTING DEFLECTION AMOUNT OF INK JET IN INK JET PRINTER

[75] Inventors: Masayoshi Tamai; Tetsuo Iyoda; Yukihisa Koizumi, all of Ebina, Japan

[73] Assignee: Fuji Xerox Co., Ltd., Tokyo, Japan

[21] Appl. No.: 538,565

[22] Filed: Oct. 3, 1983

[30] Foreign Application Priority Data

Oct. 7, 1982 [JP] Japan .................. 57-176625

[51] Int. Cl.³ .................. G01D 15/18; G01V 9/04
[52] U.S. Cl. .................. 346/75; 346/1.1; 250/222.1
[58] Field of Search .................. 346/1.1, 75; 250/221, 250/222.1

[56] References Cited

U.S. PATENT DOCUMENTS

| | | | |
|---|---|---|---|
| 4,068,222 | 1/1978 | Treviranus | 250/221 X |
| 4,225,754 | 3/1981 | Crean et al. | 346/75 |
| 4,303,142 | 9/1983 | Kondo | 250/221 |
| 4,328,504 | 5/1982 | Weber et al. | 346/75 |
| 4,392,142 | 7/1983 | Seachman et al. | 346/75 X |

Primary Examiner—George H. Miller, Jr.
Attorney, Agent, or Firm—Spensley Horn Jubas & Lubitz

[57] ABSTRACT

A method for detecting a deflection amount of ink jets according to the present invention applied to an ink jet printer is effected by projecting light upon a flying ink drop, and detecting deflection amount of the ink drop on the basis of behavior of the light reflected by the ink drop. Further, a device for detecting a deflection amount of ink jets according to the invention utilizing the above method comprises a light emitting device for emitting the light, one or plural light receiving devices for receiving the light reflected by the ink drops a signal processing circuit for producing a detection signal indicative of the deflection amount of the above ink drop on the basis of the presence or absence and the level of the output of the light receiving device.

8 Claims, 9 Drawing Figures

METHOD AND DEVICE FOR DETECTING DEFLECTION AMOUNT OF INK JET IN INK JET PRINTER

BACKGROUND OF THE INVENTION

1. Field of the Invention

This invention relates to method and device for detecting deflection amount of ink jets in an ink jet printer wherein ink drops are continuously discharged from a nozzle or nozzles to effect printing by means of the ink drops. More particularly, this invention relates to method and device suitable for use in an ink jet printer of multi-nozzle type wherein a plurality of nozzles are disposed substantially perpendicular to the direction of deflection of flying ink drops, whereby printing speed is elevated.

2. Description of the Prior Art

In a conventional ink jet printer, ink is pressurized by a pump so that the ink is jetted from a nozzle. In this mechanism, however, there is a case of causing such a disadvantage that load applied to the pump fluctuates because of change in viscosity of the ink due to temperature, decrease in filterable area of a filter due to continuous use, etc. so that the rate of discharge for the ink becomes fluctuated. Theoretically, the deflection amount of ink drops is determined by deflection force of electrostatic field in the flying course of the ink drops and a rate of discharge of the ink from a nozzle. Therefore, fluctuation in load with respect to the pump brings about variation in the deflection amount of the ink drops, causing the distortion in the printed image.

Accordingly, in such a conventional ink jet printer, fluctuation in the deflection of the ink drops has been reduced by such a manner that the deflection is detected from time to time and driving force of the pump is subjected to feedback control on the basis of the detected result. As a method for detecting the deflection, such a method has heretofore been adopted in which change induced in an electric conductor by the charge ink drop is converted into voltage. In the above method, however, occurrence of various disadvantages could not be avoided particularly to an ink jet printer of multi-nozzle type wherein a plurality of nozzles are disposed substantially perpendicular to a direction of the deflection.

More specifically, in the above-mentioned method, when applied to the multi-nozzle type ink jet printer, either a plurality of sensors for detecting the deflection amount are arranged in a row in respect to the respective nozzles, or a single sensor is provided for only any one nozzle among the above nozzles. In the former case, since the sensor has a large dimension of several tens millimeters, it is difficult to use such large sensors in the multi-nozzle type printer where a distance between nozzles cannot be kept so broad. On the other hand, in the latter case, since the conditions of the nozzles other than the sensor-provided nozzle cannot be known, it is required to reduce error among the nozzles by maintaining the dimensions of all the nozzles and charging electrodes uniform. Thus, the manufacture of these nozzles ahd charging electrodes are difficult.

SUMMARY OF THE INVENTION

It is an object of the present invention to provide a method and device for detecting a deflection amount of ink jets by which the deflection amount of ink jets can be detected easily and precisely in a small space and which is particularly suitable for use in an ink jet printer of multi-nozzle type.

In the method for detecting deflection amount of ink jets according to the present invention, flying ink drops, is irradiated by light, and the deflection amount of ink jets is detected on the basis of behavior of the light reflected by the above ink drops.

Furthermore, the device for detecting deflection amount of ink jets according to the present invention comprises light emitting means for irradiating the ink jets and light receiving means, light reflected by ink drops of the ink jets being received by the light receiving means, and output of the light receiving means being led into a processing circuit, whereby the deflection amount of ink jets is detected.

In accordance with the method and device for detecting deflection amount of ink jets of the present invention, effect of noise can remarkably be reduced, and deflection amount of ink jets can precisely be detected as compared with a method of conventional electrostatic system, because positions of an ink drop are optically detected. Furthermore, since the device itself can be considerably miniaturized, it is particualrly effective for applying the device to a multi-nozzle type ink jet printer. In addition, the method and device of the present invention can effectively cope with deposited ink on slit part and sensor part of a device which has been a problem particularly in a system wherein ink drops are permitted to fly through the slit.

DESCRIPTION OF THE PREFERRED EMBODIMENTS

The principle of operation in the present invention will be described by referring to FIGS. 1 to 3.

Figure 1:
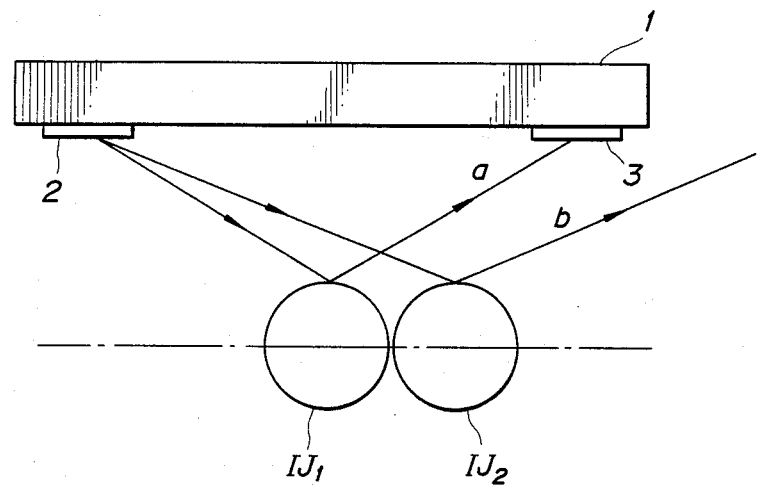
FIGS. 1, 2 and 3 are views each illustrating principle of operation in method and device for detecting a deflection amount of ink jets according to the present invention.
Figure 2:
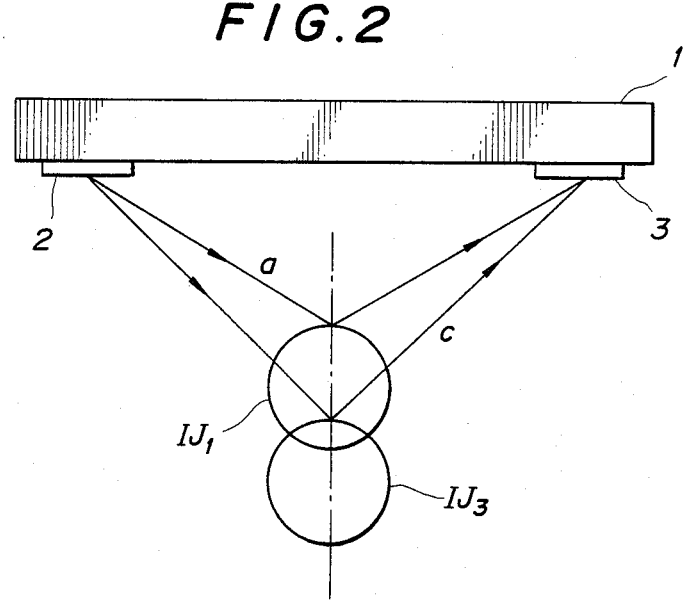

In FIGS. 1 and 2, reference numerals 1, 2 and 3 designate a base plate, a light emission element, and a light reception element, respectively, and positions of the light emission element 2 and the light reception element 3 both attached to the base plate 1 are arranged in such that light emitted from the light emission element 2 is totally reflected by the surface of an ink drop IJ$_1$ being at its normal position, and the light reflected reaches the light reception element 3 by way of a course a. In this case, it is to be noted that a flying direction of ink jet is perpendicular to the surface of the drawing. Referring to FIG. 1, when the ink jet is deflected by the deflection force of the electrostatic field so that the ink drop moves to the position IJ$_2$, light reflected by the surface of the ink drop IJ$_2$ passes through a course b, and as a result the reflected light does not reach the light reception element 3. Accordingly, it can at least be found whether or not the ink jet flys towards a desired direction.

FIG. 2 shows behavior of ink jet in the case where the ink jet is deflected in a direction departing from the light emission element 2 and the light reception element 3 wherein light emitted from the light emission element 2 is reflected by the surface of a deflected ink drop IJ$_3$, and the light reaches the light reception element 3 through a course c. The intensity of light at the light reception element 3 through the course is smaller than that of the light which is totally reflected by the ink drop IJ$_1$ of normal position and reaches the light reception element 3 by way of the course a. Thus, by examining photoelectric current in the light reception element 3, it can be detected that the ink jet is deflected to a direction departing from the light emission element 2 and the light reception element 3.

Figure 3:
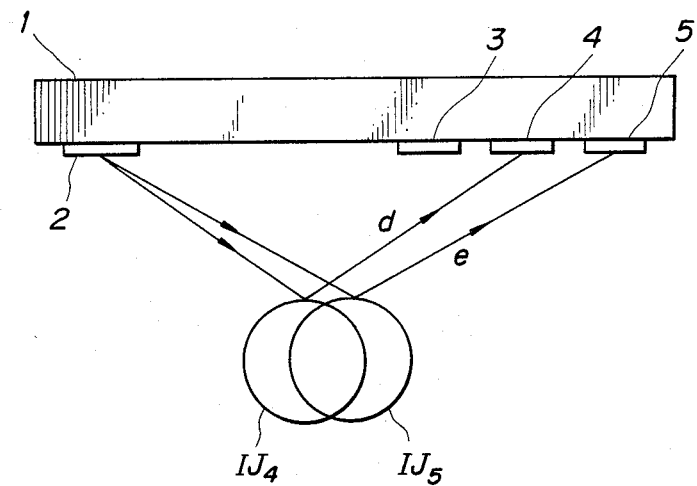

FIG. 3 shows a construction by which amount of deflection of the ink jets can be measured in which the light emission element 2 as well as the light reception elements 3, 4 and 5 are disposed on the base plate 1, and these elements 2, 3 and 4 are arranged in, for example, such that light emitted from the light emission element 2 reaches the light reception element 4 through a course d when the light is reflected at an ink drop IJ$_4$, whilst light emitted from the light emission element 2 reaches the light reception element 5 via a course e when it is reflected at an ink drop IJ$_5$. In the above construction, if the reflected light from the ink drop in the normal position reaches the light reception element 3, it can be detected how far the ink drop has deflected from the normal position by detecting the fact that which light reception element receives the light emitted from the light emission element 2.

Figure 4:
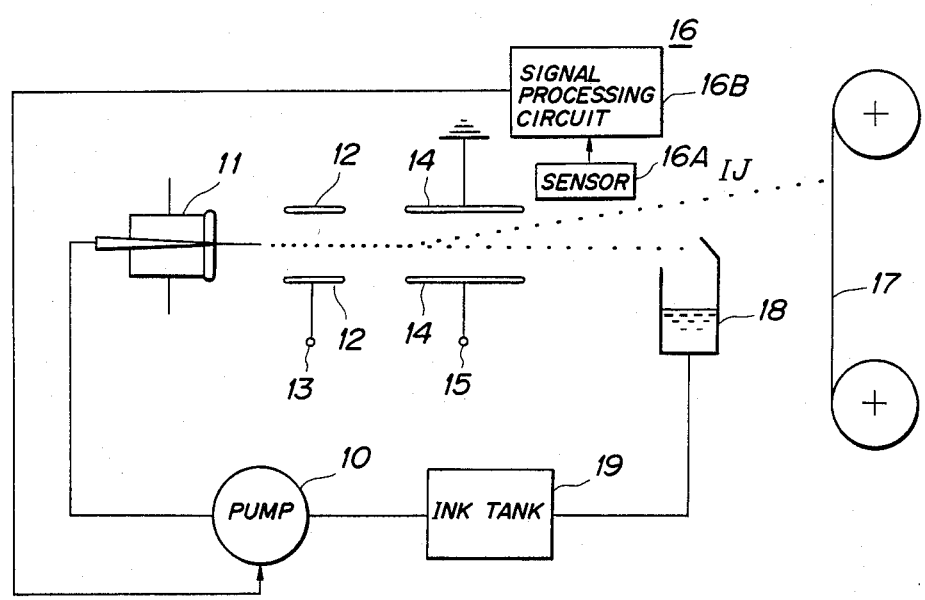
FIG. 4 is a block diagram showing an example of construction wherein a device for detecting a deflection amount of ink jets according to the invention is applied to an ink jet printer of charge controlling type.

FIG. 4 shows an example of construction in which a device for detecting deflection amount of ink jets according to the present invention which has been constructed on the basis of the above-mentioned principle is applied to an ink jet printer. In FIG. 4, reference numeral 10 designates a pump, 11 an ink jet nozzle provided with an ultrasonic vibrator, 12 a charging electrode, 13 a terminal for applying an image signal, 14 a deflecting electrode, 15 a terminal for applying deflection voltage, 16 the device for detecting deflection amount consisting of a sensor 16A and a processing unit 16B, 17 a roll paper, 18 an ink collecting vessel, and 19 an ink tank, respectively.

Operation of the ink jet printer will be described hereinbelow.

The pump 10 receives the ink which is stored in the ink tank 19 and, at the same time, applies a given pressure, typically a pressure of 2–3 Kg/cm$^2$ to the ink to feed it into the nozzle 11. The nozzle 11 is subjected to ultrasonic vibration to reduce the ink into ink drops in synchronizing with the ultrasonic vibration to inject the ink drops. Amount of charge of the ink drops IJ is controlled by the charging electrode 12 to which an image signal is applied via the terminal 13, and the ink drop receives deflection force from the electrode 14 in an amount corresponding to the amount of charge. Thereafter, the ink drops reach the roll paper 17 after passing through the vicinity of the sensor 16A. The sensor 16A detects deflection of the ink drops IJ in such manner as mentioned above. The signal processing unit 16B receives the signal from the sensor 16A and judges on whether any of the light reception element receives light or not, or which light reception element received the light and produce a signal indicating an amount of deflection of the ink drops IJ on the basis of level in the output of the light reception element. This signal is subjected to feedback to the pump 10 to correct value by controlling driving force of the pump 10 in the event that the above-mentioned amount of deflection is not appropriate. If an ink drop had not been charged by the charging electrode 12, it is not deflected, and collected in the ink collecting vessel 18 without reaching the roll paper 17. The collected ink drops are again stored in the ink tank 19.

It is to be noted that fundamental construction and operation of the ink jet printer are the same also in a multi-nozzle type printer in which a plurality of nozzles are provided.

Next, some examples will be described wherein the deflection amount detecting device 16 as mentioned above is applied to a multinozzle type printer. Since the signal processing unit 16B can easily be constructed by well-known technique, the construction and function of the sensor 16A will be described herein.

Figure 5:
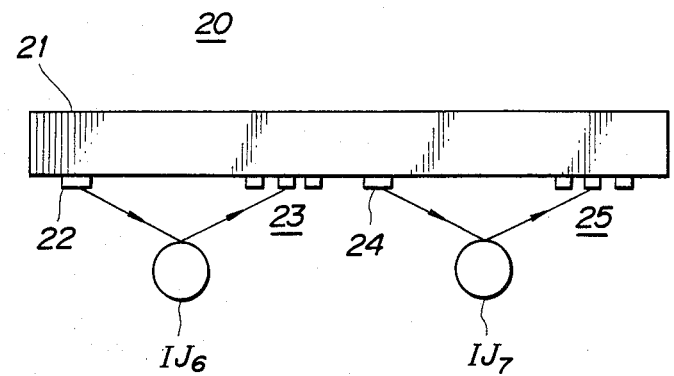
FIG. 5 is a front view showing an example of construction with respect to particularly a sensor part of a device for detecting a deflection amount of ink jets according to the invention.

FIG. 5 illustrates a sensor 20 wherein the sensor 16A shown in FIG. 4 is utilized and such sensor is constructed on the basis of the principle illustrated in FIG. 3. FIG. 5 shows a case in which the sensors are applied to a printer provided with two nozzles for convenience's sake. In FIG. 5, reference numeral 21 designates a base plate, 22 and 24 light emission elements, and 23 and 25 groups of light reception elements, respectively. The sensor 20 is constructed in such that a first sensor consisting of the light emission element 22 and the light reception element group 23 detects the deflection behavior of a first ink drop IJ$_6$ flying from either of two nozzles, whilst a second sensor consisting of the light emission element 24 and the light reception element group 25 detects the deflection behavior of a second ink drop IJ$_7$ flying from the other nozzle.

As in the above described manner, the amount of the deflection of the ink drop IJ$_6$ or IJ$_7$ is detected on the basis of the output of one of the light reception elements which receives light among the above group 23 or 25 of light reception elements, and further, of the level of output of the light reception element. In the case where more than two nozzles are provided, the light emission elements as well as the groups of light reception elements may be increased corresponding to the number of nozzles increased.

Figure 6:
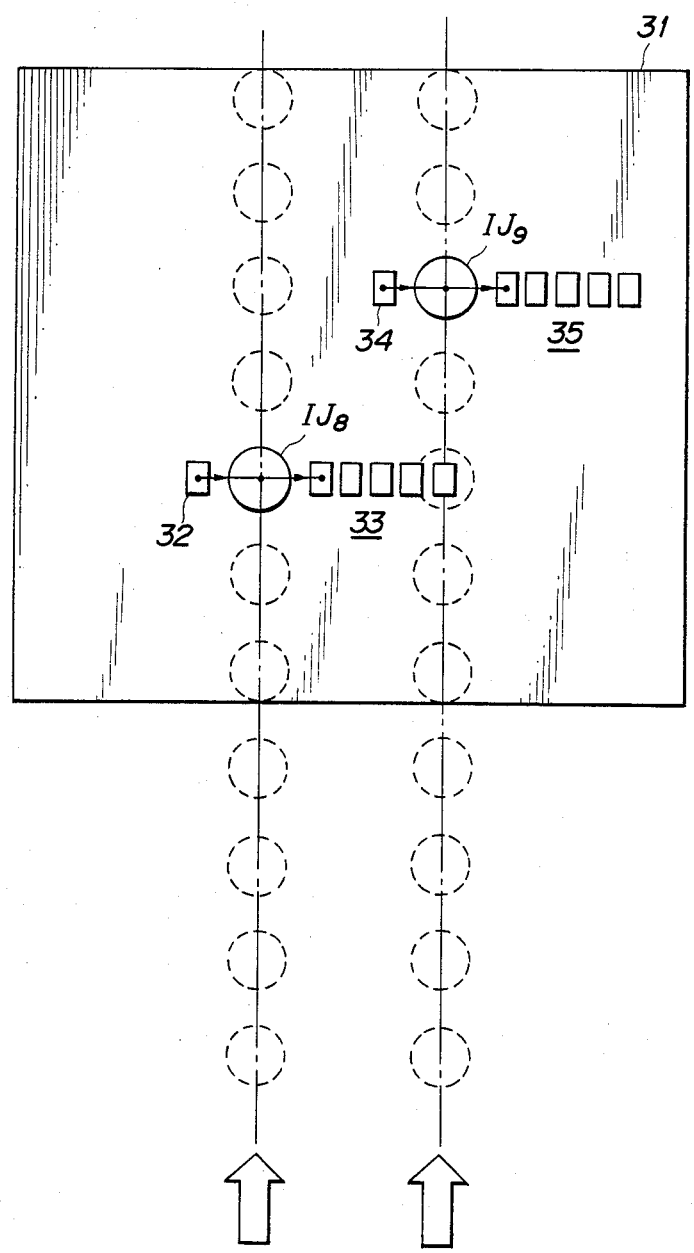
FIG. 6 is a plan view illustrating an example of construction with respect particularly to a sensor part of a device for detecting a deflection amount of ink jets of the present invention.

FIG. 6 illustrates an arrangement wherein the sensors according to the present invention are applied to a multinozzle type ink jet printer in which the nozzles are disposed in close vicinity to one another, i.e., the nozzles are arranged with a high density. FIG. 6 is the illustration viewed from the perpendicualr direction to the sensor base plate and shows an example in which the sensors are applied to a printer provided with two nozzles for convenience's sake.

In FIG. 6 reference number 31 designates a base plate, 32 and 34 light emission elements, and 33 and 35 groups of light reception elements, respectively, and it is constructed in such that a first sensor composed of the light emission element 33 and the light reception element group 33 detects the deflection behavior of a first $IJ_8$ on the left side of the drawing in the abovementioned manner, whilst a second sensor composed of the other light emission element 34 and the light reception element group 35 detects the deflection behavior of a second ink drop $IJ_9$ appeared on the right side of the drawing in the same manner. By disposing the sensors as shown in FIG. 5 on different levels from each other in respect of the flying direction of ink drops, the sensors can easily be applied to such a printer having high density of the nozzles.

Figure 7A:
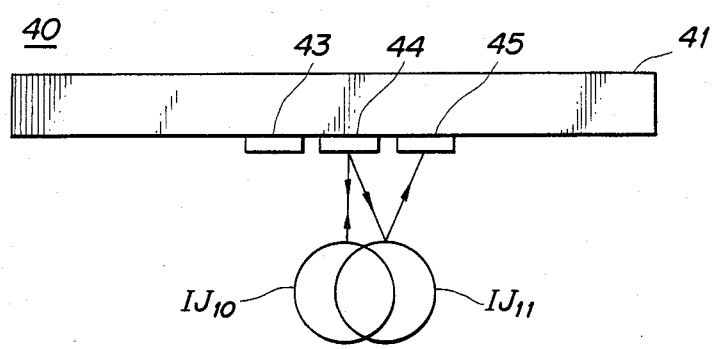
FIG. 7($a$) and 7($b$) are front and plan views illustrating an example of construction with respect particularly to a sensor part of a device for detecting a deflection amount of ink jets according to the invention.
Figure 7B:
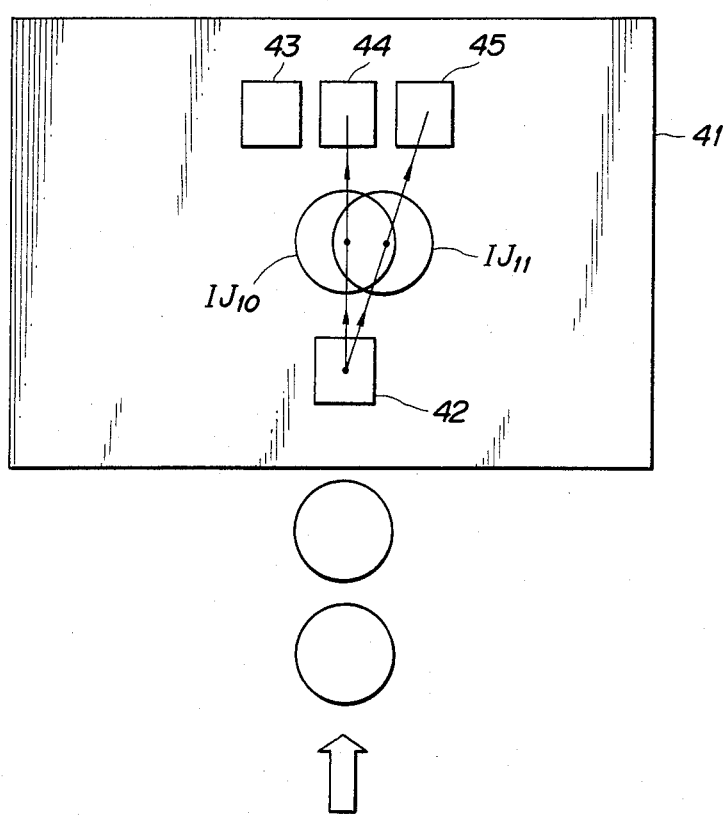

FIGS. 7(a) and 7(b) show an example of another arrangement of a light emission element and light reception elements which construct a sensor 40 suitable for use in a multi-nozzle type ink jet printer having high density of nozzles. FIG. 7(a) is an illustration wherein the sensor is viewed from the front of a flying direction of ink jets, while FIG. 7(b) is an illustration wherein the sensor is viewed from the perpendicular direction to the sensor base plate.

In FIG. 7(a) and 7(b), reference numeral 41 designates a base plate, 42 a light emission element, 43, 44 and 45 light reception elements. These elements are arranged in such a relationship in respect of their positions that light which is emitted from the light emission element 42 and reflected by an ink drop $IJ_{10}$ reaches the light reception element 44, whilst light emitted from the light emission element 42 and reflected by a deflected ink drop $IJ_{11}$ reaches the light reception element 45. The deflection behavior of ink drops can effectively be detected as in the above case. By arranging the light emission element and the light reception elements with respect to flying ink drops as illustrated in FIGS. 7(a) and 7(b), the amount of deflection of ink drops can efficiently be detected, besides sensor width viewed from the flying direction of ink drops may be reduced. Hence, it becomes more advantageous to adopt such sensor for a multi-nozzle ink jet printer having high density of nozzles. In case of utilizing the sensor shown in FIGS. 7(a) and 7(b) in the multi-nozzle ink jet printer, such sensors may be arranged with number thereof corresponding to that of the nozzles in the right and left directions of the drawing.

Figure 8:
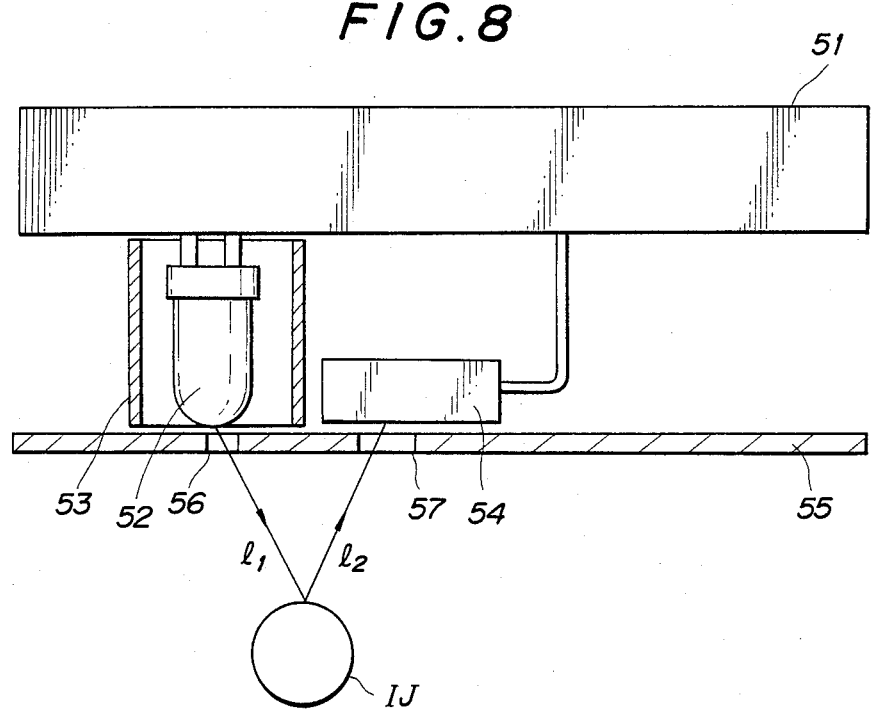
FIG. 8 is a sectional view showing the case wherein a sensor part of a device for detecting a deflection amount of ink jets according to the invention is constructed by employing commercially available optical devices.

FIG. 8 is a sectional view illustrating an example of a sensor in which the sensor according to the present invention is constructed by employing commercially available optical devices wherein reference numeral 51 designates a base plate, 52 an LED, 53 a light interception cylinder for intercepting unnecessary light from the LED 52, 54 a photodiode, 55 a light interception plate, and 56 and 57 pinholes bored in the light interception plate 55, the LED 52 and the photodiode 54 being secured to the base plate 51, the light interception plate 55 being also attached to the base plate by means of a stem. In the above construction, the pinhole 56 is formed for defining an area of emission of light $l_1$ being emitted from the LED 52 towards an ink drop IJ, whilst the pinhole 57 is formed for defining an area of light reception of light $l_2$ which is reflected by the ink drop IJ and reaches the photodiode 54. By such construction as described above, only deflection behavior of the ink jet to be detected can exactly be found by means of the above described sensor. In this connection, a diameter of the pinhole 56 is 0.2 mm, and a diameter of the pinhole 57 is 1 mm.

If such sensor as described above is constructed in a hybrid type IC by directly attaching an LED and a photodiode chip to a ceramic substrate, the resulting device can be much more miniaturized and in addition, light efficiency thereof is also elevated.

Other than the photodiode, for example, a thin film sensor which has been utilized in an original reader may be used as a light reception element in the sensor according to the present invention. In this case, such thin film sensors may be disposed on the sensor base plate in response to the respective nozzles in a multi-nozzle ink jet printer.

What is claimed is:

1. A method for detecting a deflection amount of ink jets in an ink jet printer comprising the steps of projecting light upon a flying ink drop, and detecting a deflection amount of said ink drop on the basis of behavior of the light reflected by said ink drop.

2. A device for detecting a deflection amount of ink jets comprising:
    light emitting means for projecting light upon a flying ink drop being jetted from a nozzle;
    light receiving means for receiving the light reflected by said ink drop; and
    signal processing means for producing a detection signal indicating a deflection amount of said ink drop based on the output of said light receiving means.

3. A device for detecting a deflection amount of ink jets as claimed in claim 2 wherein said light receiving means is includes a single light reception element which is provided for ink drops jetted from a single nozzle, and said signal processing means produces said detection signal based on the presence or absence of a light reception signal outputted from said light reception element.

4. A device for detecting a deflection amount of ink jets as claimed in claim 2 wherein said light receiving means includes a single light reception element which is provided for ink drops jetted from a single nozzle, and said signal processing means produces said detection signal based on the level of light reception signal outputted from said light reception element.

5. A device for detecting a deflection amount of ink jets as claimed in claim 2 wherein said light receiving means includes a single light reception element which is provided for ink drops jetted from a single nozzle, and said signal processing means produces said detection signal based on the presence or absence of a light reception signal and the level of the light reception signal outputted from said light reception element.

6. A device for detecting a deflection amount of ink jets as claimed in claim 2 wherein said light receiving means includes a plurality of light reception elements which are provided for ink drops jetted from a single nozzle, and said signal processing means produces said detection signal based on recognition of the light reception element which actually outputted light reception signal among said plurality of light reception elements.

7. A device for detecting a deflection amount of ink jets as claimed in claim 2 wherein said light receiving means includes a plurality of light reception elements which are provided for ink drops jetted from a single nozzle, and said signal processing means produces said detection signal based on recognition of the light reception element which actually outputted light reception signal among said plurality of light reception elements as well as the level of the light reception signal from said light reception elements thus recognized.

8. A device for detecting a deflection amount of ink jets as claimed in claim 2 wherein said light emitting means and said light receiving means are disposed on the same plane.

* * * * *